(12) United States Patent
Girouard

(10) Patent No.: US 6,523,565 B2
(45) Date of Patent: Feb. 25, 2003

(54) PRESSURE REGULATOR

(75) Inventor: Erick Girouard, Guelph (CA)

(73) Assignee: Teleflex GFI Control Systems L.P., Kitchener ( * ) Notice: Subject to any disclaimer, the term of this patent is extended or adjusted under 35 U.S.C. 154(b) by 0 days.

(21) Appl. No.: 09/886,120

(22) Filed: Jun. 22, 2001

(65) Prior Publication Data

US 2002/0011270 A1 Jan. 31, 2002

(30) Foreign Application Priority Data

Jun. 23, 2000 (CA) ............................................. 2312237

(51) Int. Cl.⁷ ........................ F16K 31/165; G05D 16/06
(52) U.S. Cl. ............ 137/505.43; 137/505; 137/505.39; 251/85
(58) Field of Search ............................ 137/505, 505.39, 137/505.41, 505.42, 505.43; 251/85

(56) References Cited

U.S. PATENT DOCUMENTS

| | | |
|---|---|---|
| 1,114,043 A | 10/1914 | Ricketts |
| 1,264,006 A | 4/1918 | Bucknam |
| 1,731,519 A | 10/1929 | Bastian |
| 1,842,236 A | 1/1932 | Bastian |
| 1,883,690 A | 10/1932 | Gilgenberg |
| 2,015,977 A | 10/1935 | Thrall |
| 2,057,133 A | 10/1936 | Bryce et al. |
| 2,057,150 A | 10/1936 | Kehl et al. |
| 2,192,630 A | 3/1940 | Beam |
| 2,280,390 A | 4/1942 | Ensign |
| 2,302,284 A | 11/1942 | Abbott |
| 2,306,060 A | 12/1942 | Jacobsson |
| 2,318,721 A * | 5/1943 | Siver ..................... 137/505.43 |

(List continued on next page.)

FOREIGN PATENT DOCUMENTS

| | | |
|---|---|---|
| BE | 387 342 | 4/1932 |
| DE | 37 08 166 A | 9/1988 |
| DE | 4445 588 A1 | 12/1994 |
| EP | 0 354 427 | 7/1989 |
| GB | 613429 | 11/1948 |
| GB | 2173576 A | 10/1986 |
| GB | 2226119 A | 6/1990 |
| JP | 58123112 | 7/1983 |

Primary Examiner—Stephen M. Hepperle
(74) Attorney, Agent, or Firm—Gowling Lafleur Henderson LLP (57) ABSTRACT

The present invention provides a pressure regulator comprising a housing including a high pressure chamber and a low pressure chamber, a moveable pressure boundary member configured to isolate the high pressure chamber from the low pressure chamber, a pintle valve, including a pintle stem and a pintle retainer, the pintle stem extending through the moveable pressure boundary member and carrying the pintle retainer, the pintle retainer being disposed in the low pressure chamber, and a resilient member interposed between the pintle retainer and the moveable pressure boundary member.

The present invention also provides a pressure regulating valve comprising a housing, including a low pressure chamber and a high pressure chamber, a moveable pressure boundary member, a moveable pressure boundary member, configured to isolate the high pressure chamber from the low pressure chamber, and configured to limit movement of the moveable pressure boundary member.

20 Claims, 5 Drawing Sheets

U.S. PATENT DOCUMENTS

| | | | |
|---|---|---|---|
| 2,362,352 A | 11/1944 | Buttner | |
| 2,687,018 A | 8/1954 | Baldwin, Jr. et al. | |
| 2,696,714 A | 12/1954 | Hughes | |
| 2,704,551 A | 3/1955 | Ralson | |
| 2,768,643 A | 10/1956 | Acomb | |
| 2,794,321 A | 6/1957 | Warner et al. | |
| 2,824,186 A | 2/1958 | Binford | |
| 2,819,728 A | 6/1958 | Gage et al. | |
| 3,023,093 A | 2/1962 | Hughes | |
| 3,117,591 A * | 1/1964 | Schutmaat | 137/505.41 |
| 3,176,709 A | 4/1965 | Jones | |
| 3,211,175 A | 10/1965 | Replogle | |
| 3,323,535 A | 6/1967 | Klemm et al. | |
| 3,386,458 A | 6/1968 | Wasserman et al. | |
| 3,443,583 A | 5/1969 | Webb | |
| 3,643,683 A | 2/1972 | Semon | |
| 3,960,126 A | 6/1976 | Shinoda | |
| 4,069,839 A * | 1/1978 | Hughes | 137/505.46 |
| 4,276,902 A | 7/1981 | Roth | |
| 4,349,136 A | 9/1982 | Fallon et al. | |
| 4,484,695 A | 11/1984 | Fallon et al. | |
| 4,541,454 A | 9/1985 | Sturman et al. | |
| 4,719,940 A * | 1/1988 | Beavers | 137/505.39 |
| 4,744,387 A | 5/1988 | Otteman | |
| 4,898,205 A | 2/1990 | Ross | |
| 5,103,861 A | 4/1992 | Lin | |
| 5,150,690 A | 9/1992 | Carter et al. | |
| 5,755,254 A | 5/1998 | Carter et al. | |
| 5,797,425 A | 8/1998 | Carter et al. | |
| 6,186,168 B1 | 2/2001 | Schultz et al | |

* cited by examiner .

PRESSURE REGULATOR

FIELD OF INVENTION

The present invention relates to pressure regulators for controlling the flow of gas, and more particularly relates to pressure regulators used for high pressure gaseous fuels such as compressed or liquified natural gas or hydrogen.

BACKGROUND OF THE INVENTION

It is becoming increasingly common to use so-called alternative fuels, such as propane or natural gas, in internal combustion engines or hydrogen in fuel cells. Often such engines are converted to use one or two or more sources of fuel, such as gasoline and natural gas; the operator has the ability to switch between sources depending on the availability and price of these fuels.

Many vehicles are manufactured to operate on gasoline only and are converted to run on two or more fuels. The vehicles are manufactured with storage tanks for gasoline, pumps for moving the gasoline from the tank to the engine, and carburetors or fuel injectors for introducing the fuel and the required amount of air for combustion into the engine.

Gaseous fuels such as propane, natural gas, and hydrogen must be stored in pressurized cylinders to compress the gas into a manageable volume. Increasing the pressure to the highest level that can safely be handled by the pressurized storage cylinder increases the amount of fuel that can be stored in that cylinder and extends the distance that the vehicle can be driven to its maximum. Typical storage cylinder pressures range from 2000 to 5000 psig.

Internal combustion engines cannot operate at such a high pressure, and the pressure of the gas must be reduced to a level at which the engine can be operated safely.

The pressure must also be regulated as it is reduced to ensure that the pressure of the fuel entering the engine is nearly constant even as the pressure in the storage cylinder is reduced. At the same time, the pressure regulation must permit as much gas as possible to be removed from the storage cylinder, and thus permit the pressure in the storage cylinder to fall to as close to the operating pressure as possible. A high pressure difference across the pressure regulator means that unused fuel remains in the storage cylinder and is unavailable to the engine.

Conventional pressure regulators having one or more stages over which the pressure is reduced are well-known and have long been used to reduce the pressure and regulate the flow of compressed gases. Some of these are known as pressurebalanced regulators and use various arrangements of springs, diaphragms and machined parts to balance pressures and fluid flow over the various stages of the regulator. In this respect, a valve is typically mounted to a diaphragm opening and closing gas supply, thereby regulating gas flow.

The diaphragms in such pressure-balanced regulators are subjected to pressure fluctuations, causing stressing of the diaphragm. The diaphragm, being made of resilient material, is susceptible to mechanical fatigue and failure caused by the above-described stresses. Failure or rupture of the diaphragm is of particular concern where sealing provided by the associated valve is compromised, thereby exposing the diaphragm to the high gas pressures within the storage cylinder.

Similarly, overpressure conditions resulting from leakage through the valve seal can overstress the valve, also leading to premature failure of this component.

SUMMARY OF THE INVENTION

In one broad aspect, the present invention provides a pressure regulator comprising a housing including a high pressure chamber and a low pressure chamber, a moveable pressure boundary member configured to isolate the high pressure chamber from the low pressure chamber, a pintle valve, including a pintle stem and a pintle retainer, the pintle stem extending through the moveable pressure boundary member and carrying the pintle retainer, the pintle retainer being disposed in the low pressure chamber, and a resilient member interposed between the pintle retainer and the moveable pressure boundary member.

In a further aspect, the present invention provides a pressure regulating valve comprising a body, a low pressure chamber, a fluid passage disposed within the body, a valve seat disposed within the fluid passage, an orifice disposed within the valve seat and communicating with the fluid passage, a valve pintle configured for sealing the orifice, including a pintle stem and a pintle retainer, the pintle stem extending through the moveable pressure boundary member and carrying the pintle retainer, the pintle retainer disposed in the low pressure chamber, a moveable pressure boundary member, coupled to the valve pintle, and configured to isolate the fluid passage from the low pressure chamber, and a resilient member interposed between the pintle retainer and the moveable pressure boundary member.

In yet another aspect, the present invention provides a pressure regulating valve comprising a body, a fluid passage disposed within the body, a valve seat disposed within the fluid passage, an orifice disposed in the valve seat and communicating with the fluid passage, a valve pintle configured for sealing the orifice, a moveable pressure boundary member, coupled to the valve pintle, comprising a diaphragm, and a detent configured to limit movement of the moveable pressure boundary member.

In yet a further aspect, the present invention provides a pressure regulating valve comprising a housing, including a low pressure chamber and a high pressure chamber, a moveable pressure boundary member, configured to isolate the high pressure chamber from the low pressure chamber and a detent, disposed in the low pressure chamber, and configured to limit movement of the moveable pressure boundary member.

By providing a resilient member between the pintle nut and the diaphragm plate, overstressing of the pintle valve during overpressure conditions is mitigated. Further, by providing an uninterrupted surface for contacting and supporting the diaphragm during overpressure conditions, failure of the diaphragm is also mitigated.

BRIEF DESCRIPTION OF THE DRAWINGS

The invention will be better understood in objects other than those set forth above will become apparent when consideration is given to the following detailed description thereof. Such description makes reference to the annexed drawings wherein.

DETAILED DESCRIPTION

Figure 1:
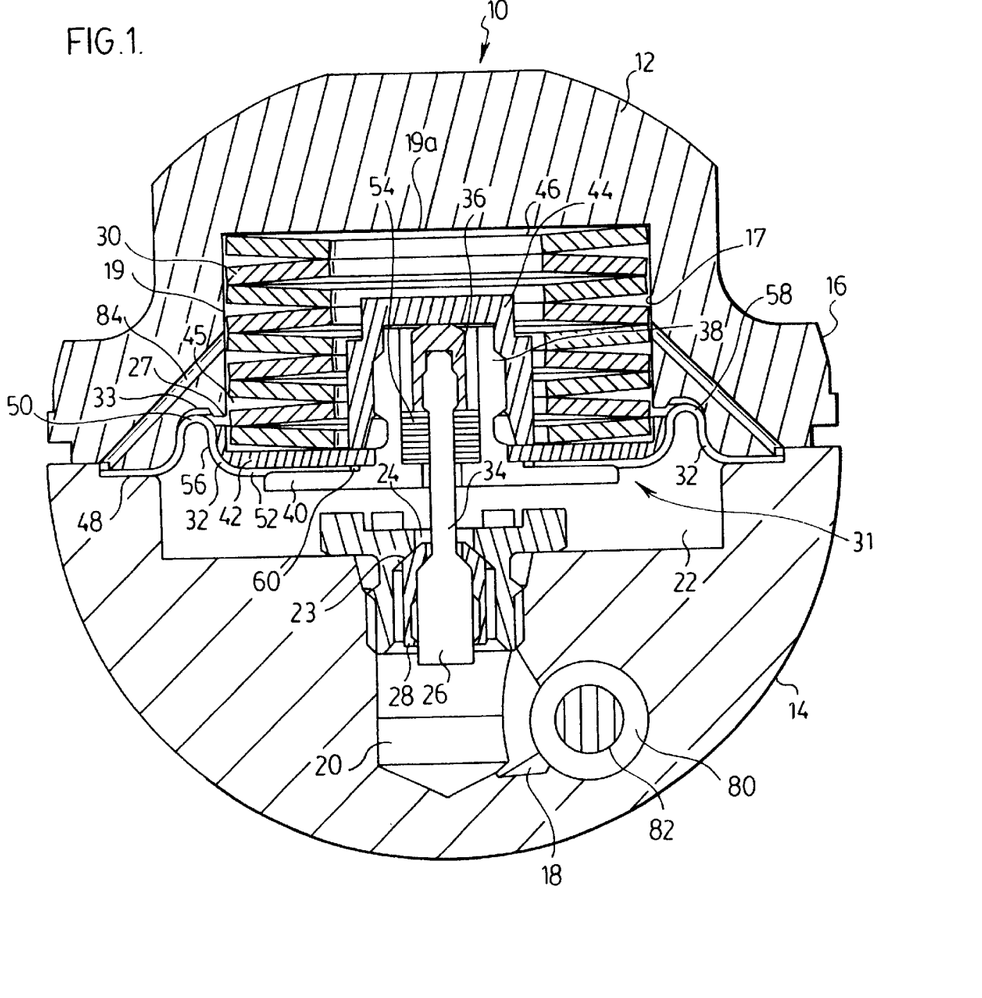
FIG. 1 is a sectional elevation view of an embodiment of a pressure regulator of the present invention showing the diaphragm support plate in a first position.

FIG. 1 illustrates an embodiment of a pressure regulator (10) of the present invention, illustrating such pressure regulator (10) in a sectional elevation view. Pressure regulator (10) includes spring housing (12) mounted to base (14) to form regulator housing (16). Housing (16) includes an inlet port (18) communicating with a pintle chamber (20) and is characterized by an internal surface (17). Pintle chamber (20) communicates with output chamber (22) and includes a valve seat (23) with orifice (24). Valve pintle (26) is disposed within pintle chamber (20) and includes sealing surface (28) to press against valve seat (23) and thereby close orifice (24). Output chamber (22) communicates with outlet port (25) (see FIG. 5) formed within housing (16).

Valve pintle (26) is movable to open and close orifice (24) in response to the combined action of spring (30) and moveable pressure boundary member (31). Spring (30) is provided within housing (16) to exert a force which tends to move the valve pintle (26) towards an open position wherein sealing surface (28) is unseated from valve seat (23), thereby opening orifice (24) into communication with output chamber (22). Gas pressure in pintle chamber (20) and output chamber (22) acts against moveable pressure boundary member (31) and valve pintle (26) thereby opposing forces exerted by spring (30) and tending to move valve pintle (26) towards a closed position, wherein sealing surface (28) is pressed against valve seat (23), thereby closing orifice (24). Pintle stem (34) extends from valve pintle (26), terminating in pintle nut (36). Pintle nut (36) is mounted within central boss (38). Central boss (38) extends through the centre of moveable pressure boundary assembly (31). A locking ring (44) fits over central boss (38) and bears down upon moveable pressure boundary member (31).

In one embodiment, moveable pressure boundary member (31) is a diaphragm assembly comprising diaphragm (32), first diaphragm plate (40), and diaphragm support plate (42). Diaphragm (32) is mounted on a first diaphragm plate (40) disposed on one side of diaphragm (32) and extending from central boss (38). The diaphragm (32) is retained on the first diaphragm plate (40) by means of a diaphragm support plate (42) and a locking ring (44). As such, diaphragm (32) is interposed and pinched between first diaphragm plate (40) and diaphragm support plate (42). Groove (48) is formed within housing (16) to receive diaphragm (32), thereby securing diaphragm (32) to housing (16). Diaphragm (32), along with plates (40) and (42) define a high pressure chamber or output chamber (22) and a low pressure chamber (45). Low pressure chamber (45) includes spring chamber (46). In this respect, diaphragm (32) seals output chamber (22) from spring chamber (46), thereby isolating output chamber (22) from spring chamber (46). Diaphragm (32) is generally characterized by a flat profile. Diaphragm (32) includes a first side surface (56) and second side surface (58). First side surface (56) is exposed to gas within output chamber (22). Diaphragm (32) further includes a through-bore (60) which receives central boss (38). In one embodiment, diaphragm (32) includes a rolling convolution (50) extending from a section (52) characterized by a flat profile, to provide a modification in the behaviour of diaphragm (32). Specifically, this design attempts to ensure that diaphragm (32) is always in tension (i e., never in shear or compression). Thus, as the convolution rolls, diaphragm (32) is never stretched or buckled (ie., largely eliminating hysteresis).

Figure 2:
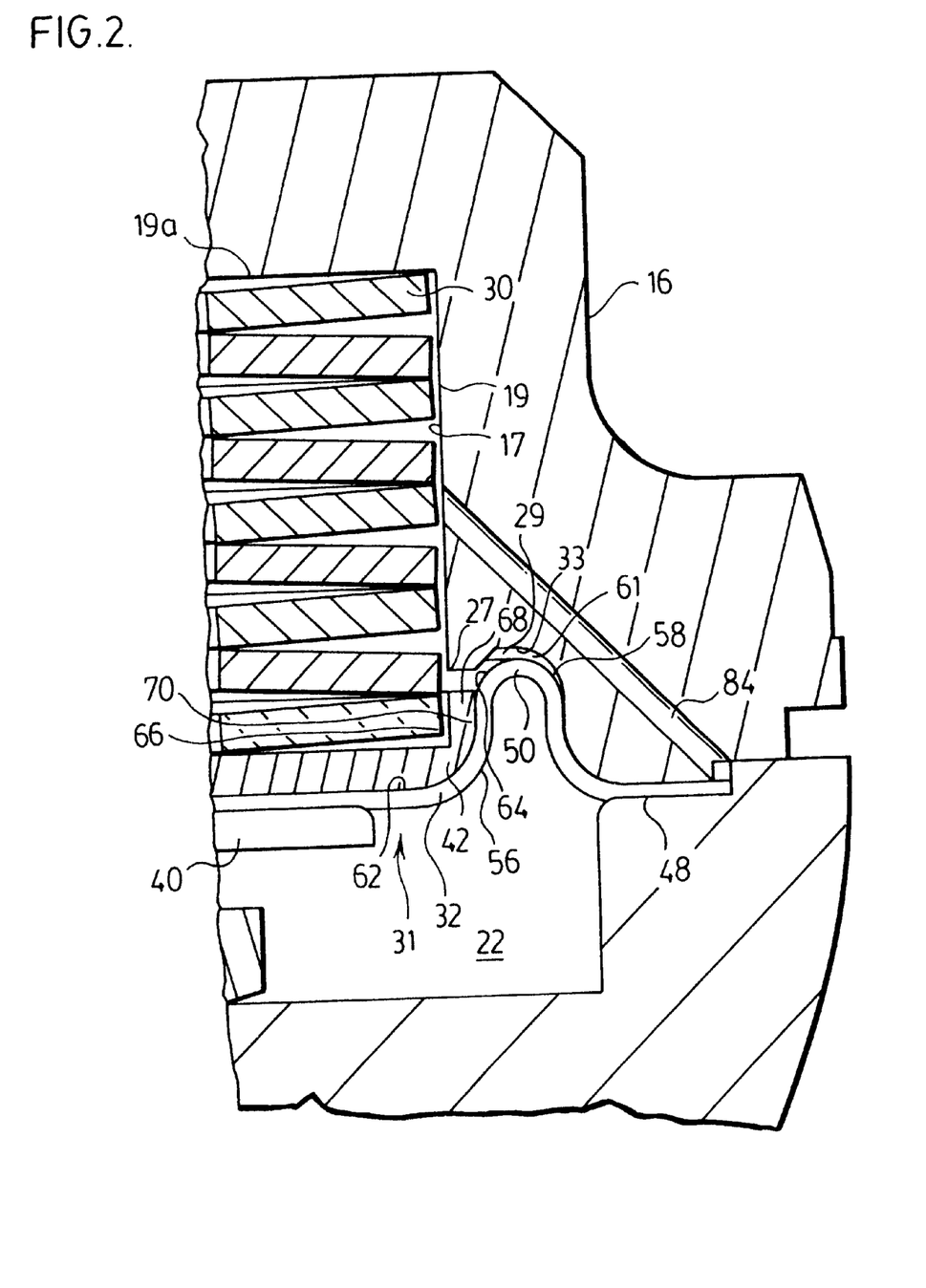
FIG. 2 is a cut-away sectional elevation view of the pressure regulator in FIG. 1, showing components in the vicinity of the annular chamber.

Spring (30) is fitted over locking ring (44), and is supported on diaphragm support plate (42). Spring (30) can include coil springs, spring washers, or elastomeric-type springs. Spring (30) is retained within a spring chamber (46) formed within housing (16). Spring chamber (46) is defined by internal sidewalls (19) for providing radial containment and positioning of spring (30) to effect biasing of valve pintle (26) towards an open position. In this respect, surface (17) of sidewalls (19) is substantially parallel to the axis of diaphragm (32). Referring to FIG. 2, sidewalls (19) terminate proximate to diaphragm support plate (42), and, therefore diaphragm (32) at an inner edge (27). Support surface (33) extends radially outwardly from sidewalls (19) at edge (27) to provide a boundary for annular space (29) about the perimeter of spring chamber (46).

Mounted within central boss (38), and between pintle nut (36) and first diaphragm plate (40) is a resilient member (54). In one embodiment, resilient member (54) includes a plurality of spring washers stacked one upon another. In another embodiment, resilient member (54) comprises a plurality of belleville-type washers stacked one upon another. Pintle nut (36) bears upon resilient member (54), transmitting forces exerted by spring (30) upon locking ring (44). Resilient member (54) is provided to prevent overstressing of valve pintle (26) during abnormal operating conditions. For instance, should the sealing of orifice (24) by valve pintle (26) fail when the output port of the regulator (10) is closed, output chamber (22) may be exposed to extremely high gas pressures. When such pressures exceed the normal range, the diaphragm (32) and first diaphragm plate (40) are displaced to cause compression of resilient member (54). The resilient member (54), being disposed under the pintle nut (36), prevents overstressing of the valve pintle (26). When sealing surface (28) is engaged against valve seat (23), valve pintle (26) is fixed in position and cannot move further in the direction of gaseous pressure forces exerted upon diaphragm (32) and diaphragm plates (40) and (42). When gaseous pressure forces are exerted in output chamber (22) when valve pintle (26) is in this position, resilient member (54) becomes compressed, thereby absorbing force being transferred by diaphragm (32) and diaphragm plates (40) and (42) as these latter components move in response to the above-described gaseous forces.

Figure 3:
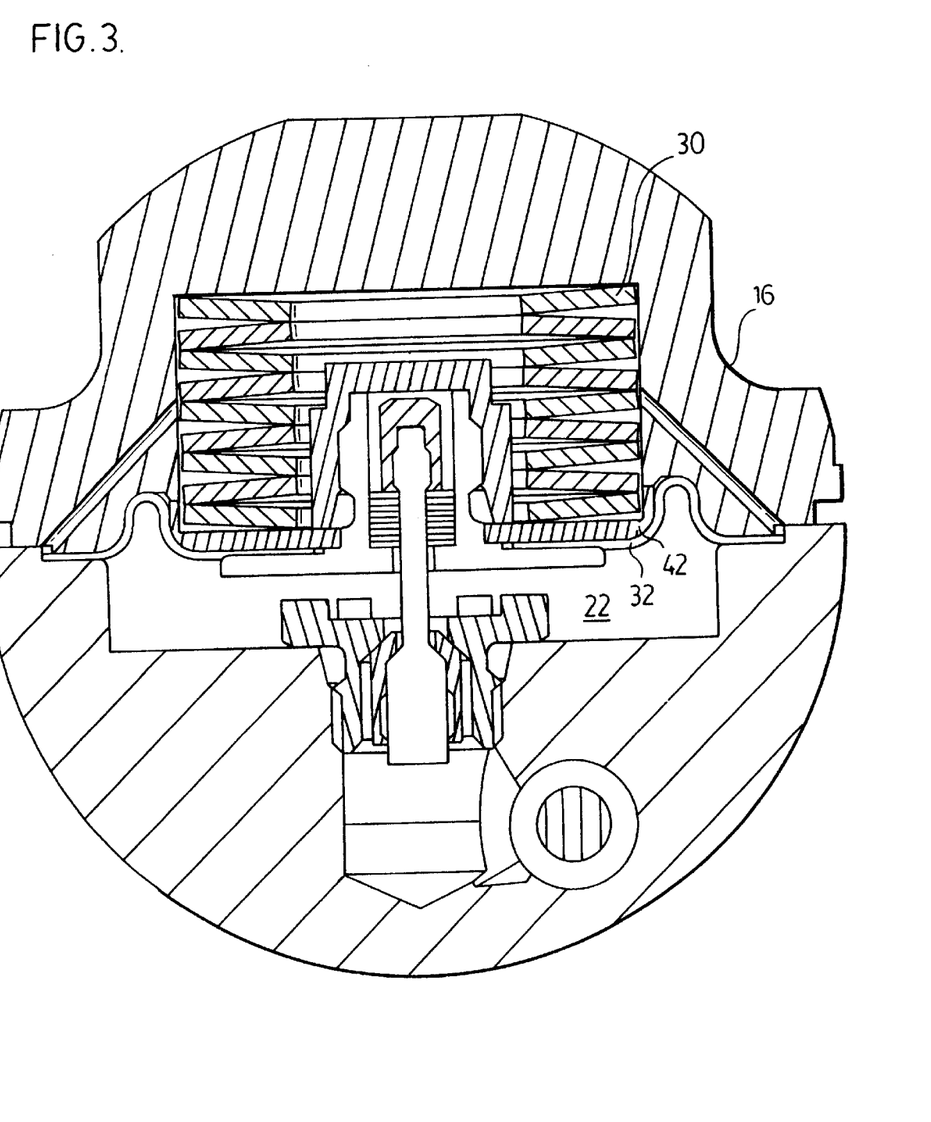
FIG. 3 is a sectional elevation view of an embodiment of a pressure regulator of the present invention showing the diaphragm support plate in a second position.

Improper sealing of orifice (24) by valve pintle (26) can also lead to mechanical fatigue and failure of diaphragm (32). To this end, in one embodiment, the regulator housing (16) and diaphragm support plate (42) are adapted to provide support to diaphragm (32) during extreme pressure conditions within output chamber (22). Diaphragm support plate (42) is characterized by first and second positions, as illustrated in FIGS. 1 and 3 respectively. In FIG. 1, gas pressure in output chamber (22) is within a normal pressure range. Under these conditions, diaphragm support plate (42) is spaced from support surface (33) of housing (16) by a gap (61) and is in contact with a first section (62) of second side surface (58) of diaphragm (32) (see FIG. 2). Contemporaneously, a second section (64) of second side surface (58) of diaphragm (32) is not in contact with any rigid surface and, therefore, floats between support surface (33) of housing (16) and output chamber (22). In one embodiment, section (64) includes rolling convolution (50).

Under these conditions, diaphragm (32) remains capable of stretching and changing its shape in the direction of gaseous pressure forces acting upon first side surface (56) of diaphragm (32).

Figure 4:
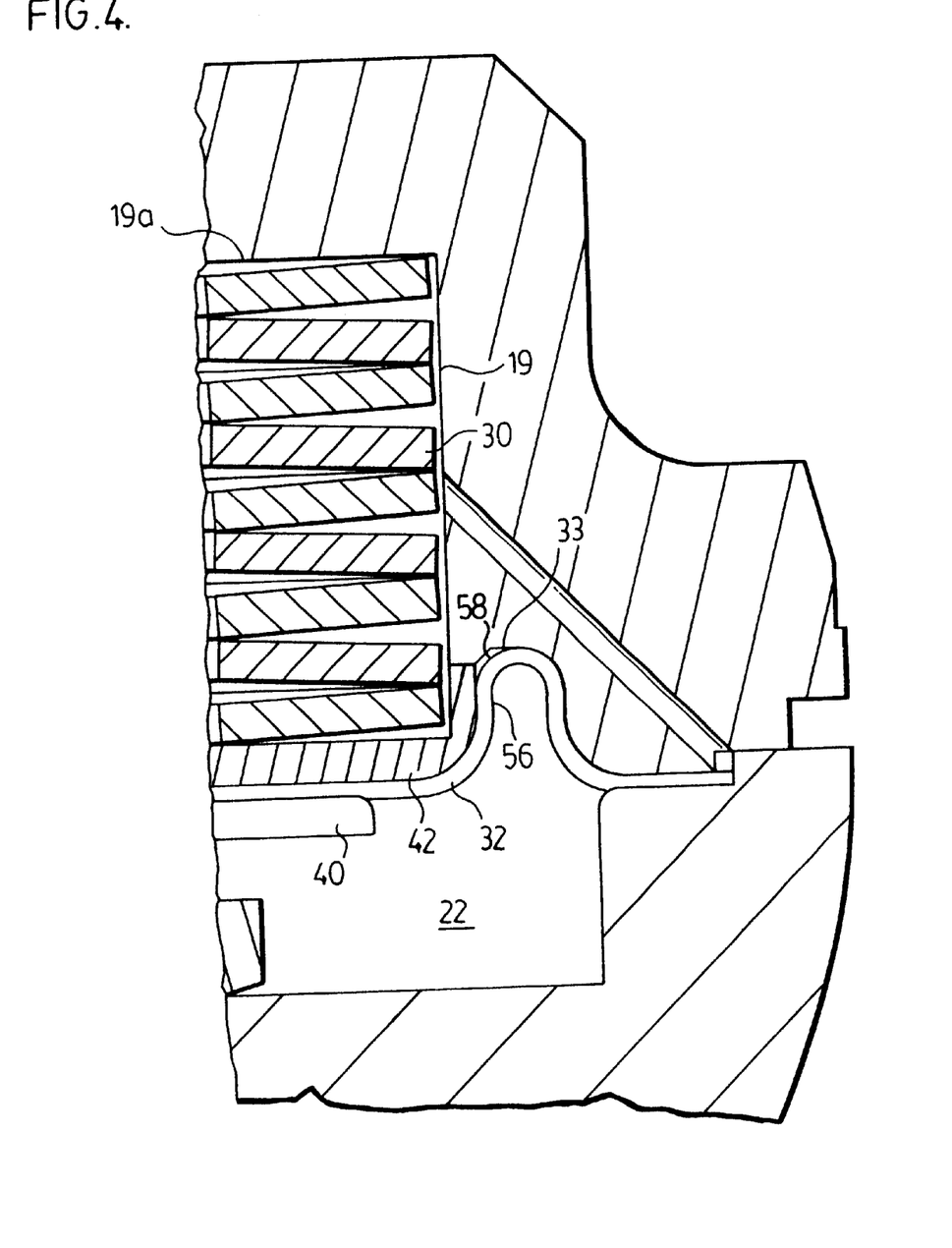
FIG. 4 is a cut-away sectional elevation view of the pressure regulator in FIG. 3, showing components in the vicinity of the annular chamber.

FIG. 3 illustrates the condition of diaphragm (32) and diaphragm support plate (42) in a second position wherein pressure within chamber (22) is characterized by an overpressure condition. Under these conditions, diaphragm support plate (42) has assumed a second position, wherein gaseous forces in output chamber (22) have urged or pressed diaphragm support plate (42) into contact with surface (33) of housing (16), thereby preventing any further movement of diaphragm support plate (42) in the direction of pressure forces being exerted by gas in output chamber (22). In this respect, surface (33) is a detent configured to limit movement of the moveable pressure boundary member (31). Simultaneously, gaseous pressure forces in output chamber (22) have urged diaphragm (32) to move in tandem with diaphragm support plate (42) towards surface (33) of housing (16) (see FIG. 4). As such, in this overpressure condition, substantially all of the second side surface (58) is in contact with either of the diaphragm support plate (42) or surface (33).

The combination of diaphragm support plate (42) and support surface (23) of housing (16) present an uninterrupted support surface or a detent to limit movement or stretching of diaphragm (32) in the direction of pressure forces exerted by gas within output chamber (22). As such, when diaphragm support plate (42) is in this second position, diaphragm (32) is protected from rupture or damage which could have occurred if the difference between (i) the pressure exerted against first side surface (56) and (ii) the pressure exerted against the second side surface (58) is greater than the strength of the diaphragm. In this respect, support surface (33) of housing (16) and diaphragm support plate (42) apply a reaction force on second side surface (58) which is equal and opposite to that exerted on first side surface (56) by gaseous pressure in output chamber (22).

To assist in preventing rupture of diaphragm (32) in the overpressure condition, detent (33) of housing (16) presents an opposing surface which is proximate to but spaced from diaphragm (32) under normal operating conditions. Further, in the overpressure condition, detent (33) presents a surface which is shaped to conform to the shape of diaphragm (32) when diaphragm (32) is subjected to overpressure but has not ruptured.

Referring to FIG. 2, in one embodiment, diaphragm support plate (42) includes a perimeter (66) comprising a side wall (68) extending in the general direction of rolling convolution (50), and thereby presents a support surface (70) for supporting rolling convolution (50). By presenting support surface (70) for supporting rolling convolution (50), the risk of rolling convolution (50) becoming pinched between diaphragm support plate (42) and housing (16) when diaphragm support plate (42) moves towards housing (16) during overpressure conditions is reduced.

Figure 5:
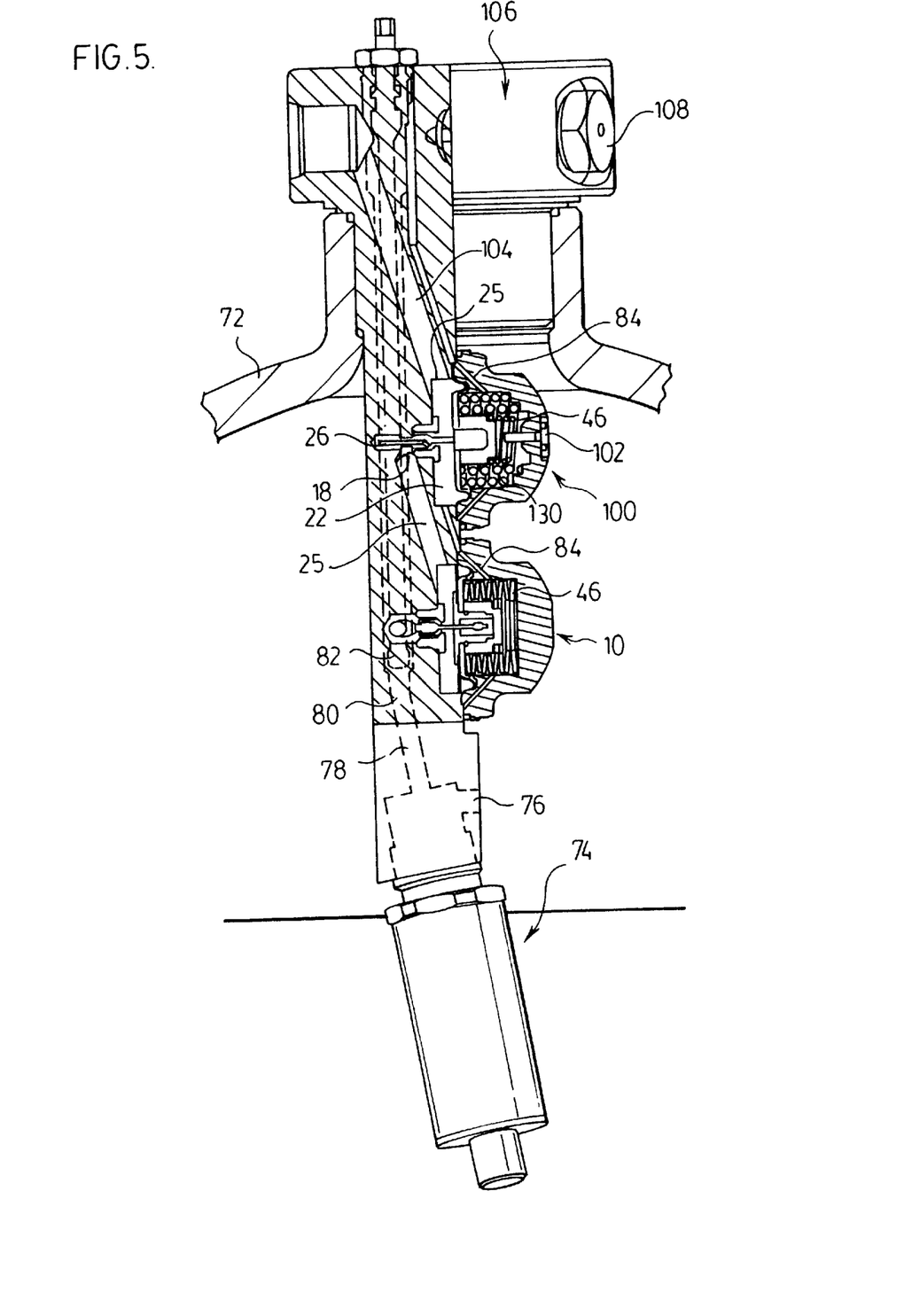
FIG. 5 is a sectional elevation view of a gas flow regulation system of the present invention, including a two-stage regulator.

In one embodiment, and as illustrated in FIG. 5, inlet port (18) communicates with high pressure gas stored in pressure vessel (72) through a solenoid valve (74). Solenoid valve (74) controls gaseous flow out of pressure vessel (72). Solenoid valve (74) includes an inlet port (76) and an outlet port (78). Outlet port (78) communicates with inlet port (18) of regulator (10) via a fluid passage (80). A manual shut-off valve (82) is provided to interrupt flow between solenoid valve (74) and inlet port (18).

Outlet port (25) can be adapted to communicate with an inlet port (18) of a second stage pressure regulator (100), as illustrated in FIG. 3. In one embodiment, pressure regulator (100) is a balanced regulator. In one embodiment an adjustable member, such as a screw (102), is provided and extends through housing (16) to regulate compression of associated spring (30), thereby varying flow control characteristics of valve pintle (26).

A vent passage (84) is also formed within housing (16) to communicate with spring chamber (46). Any gas leaking across diaphragm (32) from output chamber (22) and into spring chamber (46) is thereby vented to prevent accumulation of gas within spring chamber (46). Where pressure regulation is accomplished by first and second stage regulators (10) and (100) in series, spring chamber (46) of first stage regulator (10) vents to output chamber (22) of second stage regulator (100), while spring chamber (46) of second stage regulator (100) vents to atmosphere.

Gas flowing from a second stage regulator (100) through outlet port (25) is connected to outlet passage (104). Optionally connected to outlet passage (104) is a pressure relief device (106), that vents to a relief outlet connection (108). A sensor port (110) can also be connected to outlet passage (104) to measure outlet gas pressure.

Although the disclosure describes and illustrates preferred embodiments of the invention, it is to be understood that the invention is not limited to these particular embodiments. Many variations and modifications will now occur to those skilled in the art. For definition of the invention, reference is to be made to the appended claims.

What is claimed is:

1. A pressure regulator comprising:
    a housing including a high pressure chamber and a low pressure chamber;
    a moveable pressure boundary member configured to isolate the high pressure chamber from the low pressure chamber;
    a pintle valve, including a pintle stem and a pintle retainer, the pintle stem extending through the moveable pressure boundary member and carrying the pintle nut, wherein the pintle nut is housed within a central boss extending from and integral with the moveable pressure boundary member; and
    a resilient member interposed between the pintle nut and the moveable pressure boundary member.

2. A pressure regulator valve comprising
    a body;
    a low pressure chamber;
    a fluid passage disposed within the body;
    an orifice disposed within the valve seat and communicating with the fluid passage;
    a valve pintle configured for sealing the orifice, including a pintle stem and a pintle nut, the pintle stem extending through the moveable pressure boundary member and carrying the pintle nut, wherein the pintle nut is housed within a central boss extending from and integral with the moveable pressure boundary member;
    a moveable pressure boundary member, coupled to the valve pintle, and configured to isolate the fluid passage from the low pressure chamber; and
    a resilient member interposed between the pintle retainer and the moveable pressure boundary member.

3. A pressure regulator comprising:
    housing, including a high pressure chamber and a low pressure chamber;
    a moveable pressure boundary member, configured to isolate the high pressure chamber from the low pressure chamber, including a diaphragm; a valve member, coupled to the moveable pressure boundary member, and configured to seal a fluid passage within the high pressure chamber; and a support surface for effecting support of the diaphragm such that the diaphragm is fully supported when excessive fluid pressure forces are applied to the moveable pressure boundary member from within the high pressure chamber.

4. The pressure regulator as claimed in claim 3, wherein the moveable pressure boundary member includes a diaphragm support plate, and wherein the diaphragm projects peripherally of the diameter support plate, such that, when the excessive fluid pressure forces are applied to the moveable pressure boundary member from within the high pressure chamber, the support surface supports the diaphragm support plate, and the diaphragm is fully supported by the support surface and the diaphragm support plate.

5. The pressure regulator as claimed in claim 4, wherein the support surface limits movement of the diaphragm support plate in the direction of the fluid pressure forces applied to the moveable pressure boundary member from within the high pressure chamber.

6. The pressure regulator as claimed in claim 5, wherein the diaphragm is coupled to the diaphragm support plate.

7. The pressure regulator as claimed in claim 6, wherein the support surface is configured to apply a reaction force to the diaphragm and the diaphragm support plate, such reaction force opposing fluid pressure forces applied to the diaphragm and the diaphragm support plate from within the high pressure chamber.

8. The pressure regulator as claimed in claim 7, wherein the high pressure chamber includes an input chamber, an output chamber, and a valve seat defining an orifice effecting communication between the input and output chambers, and wherein the valve member is configured to seat against the valve seat, such that, when the valve member is seated against the valve seat and the excessive fluid pressure forces are applied to the moveable pressure boundary member from within the high pressure chamber, the support surface supports the diaphragm support plate and thereby limits movement of the diaphragm support plate in the direction of the fluid pressure applied to the moveable pressure boundary member, and the diaphragm is fully supported by the support surface and the diaphragm support plate.

9. The pressure regulator as claimed in claim 8, wherein the support of the diaphragm prevents rupture of the diaphragm.

10. The pressure regulator as claimed in claim 9, wherein the diaphragm is in a stretched condition when the diaphragm is fully supported.

11. The pressure regulator as claimed in claim 10, wherein the diaphragm support plate and the support surface present an uninterrupted surface for fully supporting the diaphragm.

12. The pressure regulator as claimed in claim 11, wherein the diaphragm is secured to the housing.

13. The pressure regulator as claimed in claim 12, wherein the diaphragm includes a rolling convolution, and wherein the diaphragm support plate presents a plate surface supporting the rolling convolution to prevent pinching of the rolling convolution between the diaphragm support plate and the support surface.

14. The pressure regulator as claimed in claim 3, wherein the support surface is configured to effect application of a reaction force to the diaphragm which opposes fluid pressure forces applied to the diaphragm from within the high pressure chamber.

15. The pressure regulator as claimed in claim 14, wherein the high pressure chamber includes an input chamber, an output chamber, and a valve seat defining an orifice effecting communication between the input and output chambers, and wherein the valve member is configured to seat against the valve seat, such that, when the valve member is seated against the valve seat and the excessive fluid pressure forces are applied to the moveable pressure boundary member from within the high pressure chamber, the diaphragm is fully supported and such support is effected by the support surface.

16. The pressure regulator as claimed in claim 15, wherein the support of the diaphragm affected by the support surface prevents rupture of the diaphragm.

17. The pressure regulator as claimed in claim 16, wherein the diaphragm is in a stretched condition when the support of the diaphragm is effected by the support surface.

18. The pressure regulator as claimed in claim 17, wherein the diaphragm is secured to the housing.

19. The pressure regulator as claimed in claim 1, further comprising a locking ring fitted over the central boss and bearing down upon the moveable pressure boundary member.

20. The pressure regulator as claimed in claim 2, further comprising a locking ring fitted over the central boss and bearing down upon the moveable pressure boundary member.

* * * * *